Patented Mar. 30, 1926.

1,578,900

UNITED STATES PATENT OFFICE.

SIMON J. LUBOWSKY, OF JERSEY CITY, NEW JERSEY, ASSIGNOR TO METAL & THERMIT CORPORATION, OF CHROME, NEW JERSEY, A CORPORATION OF NEW JERSEY.

POROUS ARTICLE OF RUTILE AND METHOD OF MAKING THE SAME.

No Drawing.   Application filed October 10, 1923.   Serial No. 667,690.

*To all whom it may concern:*

Be it known that I, SIMON J. LUBOWSKY, a citizen of the United States, and a resident of Jersey City, in the county of Hudson and State of New Jersey, have invented certain new and useful Improvements in Porous Articles of Rutile and Methods of Making the Same; and I do hereby declare the following to be a full, clear, and exact description of the invention, such as will enable others skilled in the art to which it appertains to make and use the same.

In a companion application Serial No. 607,726, filed December 18, 1922, I have described and claimed a new and useful refractory, chemical resisting material, comprising calcined rutile and articles made therefrom, which possess certain obvious utilities in the various arts. I have since discovered that if ground or crushed rutile be so worked up in the manufacture of certain articles as to possess porosity or the capacity of filtering liquids, filter bodies, such as plates, diaphragms, cups, cells, and the like, made therefrom, possess distinctive advantages and elements of utility over any similar articles as heretofore produced, in that they not only have the inherent strength, durability and capability to resist the action of heat and chemicals, but may also be so prepared in the course of manufacture as to accurately regulate the degree of porosity, which may be controlled to meet the varying conditions of use.

In carrying out the invention, the rutile is ground or crushed to any desired size of particle and mixed with water, with wet clay, or with any other suitable binding medium, with which it is associated and intimately incorporated. The porosity of the articles ultimately to be made from this material is inter-granular and may be controlled by the proper selection of grain size of the materials or by incorporating with the mass above an amount of some other material which may be subsequently removed either by heat or by being dissolved out. There are, of course, many other ways by which this porous mass may be constructed and the ultimate porosity of the finished article obtained. The rutile with or without a binder, and with or without the deletable material, is then shaped or molded into the desired form, and in most cases the articles are then burned or calcined at a temperature sufficiently high to cause the particles of rutile to cohere or to sinter together without filling the voids between the particles, but nevertheless in a way to form a very strong coherent mass. In certain cases, it may be found sufficient to merely air dry the articles shaped from the various mixtures containing the rutile, but if great strength is desired, the calcination process is almost indispensable. The calcination may be suspended when the temperature of the shaped articles has reached the point where the particles of rutile will be sufficiently fused to effect cohesion at points of mutual contact without encroaching on the voids formerly occupied by the deletable material when the latter is employed.

As indicated, the deletable material, if used, may be of various kinds or characters, such for example, as a combustible that will be consumed during the calcining operation, or, in the alternative, it may be a material that is capable of being dissolved out of the mixture after the formation of the articles, by any suitable solvent, such as water, or the various acids and alkalis, which, of course, will not affect the rutile.

The resultant product will be in the form of a hard, resistant, porous mass of mineral, retaining the original shape of the article to be manufactured, the porosity of which will depend upon the size of the original particle or upon the percentage of the deletable material employed, and which article is immediately available as a filter body and may be employed with the strongest acids and alkalis and under varying temperature conditions, without practical change or deterioration.

What I claim is:

1. A shaped, refractory, chemical-resisting article, formed of crushed rutile, the particles of which are bound together to form a porous body.

2. A shaped, refractory, chemical-resisting article, formed of crushed rutile, the particles of which are so sintered together as to form a porous body.

3. A shaped, refractory, chemical-resisting article, formed of crushed rutile, the particles of which are sintered together only at their points of mutual contact.

4. A shaped, porous, chemical-resisting article, formed of particles of rutile sintered together.

5. The method of making porous, chemical-resisting articles, which comprises forming crushed rutile into any desired shape and heating the same to cause the grains to adhere.

6. The method of making porous, chemical-resisting articles, which comprises molding crushed rutile with a binder into any desired shape and allowing or causing the binder to set.

7. The method of making porous, chemical-resisting articles, which comprises forming a paste of crushed rutile, a deletable material, and a binder; molding the mixture to the desired shape; and removing the deletable material.

8. The method of making porous, chemical-resisting articles, which comprises forming a shape of crushed rutile and a heat destructible material; shaping the mixture to the desired shape; and calcining the shaped article to eliminate the destructible material and to fuse the rutile particles into a porous mass.

In testimony whereof I affix my signature.

SIMON J. LUBOWSKY.